(12) United States Patent
Nikkeshi et al.

(10) Patent No.: US 6,379,797 B1
(45) Date of Patent: Apr. 30, 2002

(54) RESIN ADDITIVE

(75) Inventors: Susumu Nikkeshi, Miyagi-ken; Maki Kanno, Fukushima, both of (JP)

(73) Assignee: Tohoku Munekata Co Ltd, Fukushima-Ken (JP)

( * ) Notice: Subject to any disclaimer, the term of this patent is extended or adjusted under 35 U.S.C. 154(b) by 0 days.

(21) Appl. No.: 09/361,240

(22) Filed: Jul. 27, 1999

(30) Foreign Application Priority Data

| Feb. 4, 1999 | (JP) | ............................ | 11-027471 |
| Feb. 4, 1999 | (JP) | ............................ | 11-027522 |
| Feb. 5, 1999 | (JP) | ............................ | 11-028818 |
| Feb. 9, 1999 | (JP) | ............................ | 11-031467 |

(51) Int. Cl.$^7$ ............................ B32B 5/16; B32B 19/00
(52) U.S. Cl. ..................................... 428/403; 428/357
(58) Field of Search ........................... 428/323, 325, 428/328, 329, 331, 357, 403, 404, 405, 406, 412, 480–483

(56) References Cited

U.S. PATENT DOCUMENTS 6,180,225 B1 * 1/2001 Nikkeshi ..................... 428/331
6,194,489 B1 * 2/2001 Nikkeshi et al. ............. 523/212

FOREIGN PATENT DOCUMENTS

JP  10139887  *  5/1998

OTHER PUBLICATIONS

Journal of Polymer Science; Part A, vol. 2, pp. 2859–1873 (1964) Mechanisms of Thermal Degradation of Phenolic Condensation Polymers. I. Studies on the Thermal Stability of Polycarbonate.

Plastic Additives Handbook; 3rd Edition (1990), Hanser Publishers, front and introduction pages, pp. 16–19 and 250–253—Stabilizers, Processing Aids, Plasticizers, Fillers, Reinforcement, Colorants for Thermoplastics.

Journal of Plastic Seikei–Kakou (molding and processing) Association; vol. 10, No. 11 (1998), pp. 891–897 (except)—The Effects of Addition of Surface–treated Silica Particle in Polycarbonate Composites. (Abstract only).

Database WPI, Section Ch, Week 199523, Derwent Publications, Ltd., London, GB; Class A17, AN 1995–175422, Apr. 11, 1995 (Abstract).

Database WPI, Section Ch, Week 199032, Derwent Publications, Ltd., London, GB; Class A18, AN 1990–243886, Jul. 2, 1990 (Abstract).

Database WPI, Section Ch, Week 198539, Derwent Publications, Ltd., London, GB; Class A14, AN 1985–241383, Mar. 7, 1985 (Abstract).

* cited by examiner

*Primary Examiner*—Paul Thibodeau
*Assistant Examiner*—Sheeba Ahmed

(57) ABSTRACT

The present invention provides a resin additive obtained by subjecting inorganic particles to surface treatment with catechin, a resin additive obtained by subjecting inorganic particles to surface treatment with catechin and further subjecting them to surface treatment with a coupling agent or a resin additive obtained by subjecting inorganic particles to surface treatment with catechin and then subjecting them to surface treatment with a phenone compound or saccharides, followed by further subjecting them to surface treatment with a coupling agent. These resin additives have the effect to inhibit a reduction in the molecular weight of a thermoplastic resin in heating and melting or inhibit a reduction not only in the molecular weight but also the IZOT impact strength.

12 Claims, 1 Drawing Sheet

FIG. 1

RESIN ADDITIVE

FIELD OF THE INVENTION

Thermoplastic resins such as a polycarbonate resin (PC), polybutylene terephthalate (PBT), polyethylene terephthalate (PET), a blend thereof and a mixture obtained by blending one or a plurality of the above resins with other resins bring about thermal decomposition (reduction in molecular weight) when they are heated and molten in various molding processes and lower in mechanical properties. The present invention relates to a resin additive which prevents thermal decomposition thereof and to a resin additive which prevents thermal decomposition and does not reduce the impact strength to a large extent.

DESCRIPTION OF THE RELATED ART

Resin materials, particularly respective resins of PC, PBT and PET are heavily reduced in a molecular weight in melting by heating, so that the molecular weights have notably been reduced by heat given in various molding processes and shear stress exerted in kneading. Accordingly, it was difficult to recycle spools and runners produced in molding as well as recycling of the products.

According to researches made by the present inventors, the resins described above could be inhibited from lowering in a molecular weight in heating and melting by adding inorganic particles subjected to surface treatment with catechin to the resins, but there was the problem that the IZOT impact strengths were reduced.

Intensive researches of a resin additive of catechin continued by the present inventors have resulted in finding that thermo-plastic resins can be inhibited from lowering in a molecular weight in heating and melting by adding a resin additive obtained by subjecting inorganic particles to surface treatment with catechin to the above resins.

Further, the present inventors have found that thermoplastic resins can be inhibited from lowering in a molecular weight in heating and melting and can be decreased in a reduction in an IZOT impact strength by adding to the above resins, a resin additive obtained by subjecting inorganic particles to surface treatment with catechin and further subjecting them to surface treatment with a coupling agent.

In addition thereto, the present inventors have found that thermoplastic resins can be inhibited from lowering in a molecular weight in heating and melting and can be prevented from lowering in an IZOT impact strength by adding to the above resins, a resin additive obtained by subjecting inorganic particles to surface treatment with catechin and further subjecting them to surface treatment with a phenone compound or saccharides, followed by further subjecting them to surface treatment with a coupling agent.

SUMMARY OF THE INVENTION

Accordingly, the first object of the present invention is to provide a resin additive which is obtained by subjecting inorganic particles to surface treatment with catechin and which can inhibit a resin from lowering in a molecular weight in heating and melting to prevent the resin from being deteriorated.

The second object of the present invention is to provide a resin additive which is obtained by allowing the surface of inorganic particles to be contacted with a catechin solution to treat them and further treating them with a coupling agent to thereby subject them to multilayer surface treatment and which not only can prevent a resin from lowering in a molecular weight in heating and melting but also can prevent the resin from lowering in an IZOT impact strength.

The third object of the present invention is to provide a resin additive which is obtained by allowing the surface of inorganic particles to be contacted with a catechin solution to treat them and further subjecting them to surface treatment with a phenone compound or saccharides, followed by further subjecting them to surface treatment with a coupling agent to thereby subject them to multilayer surface treatment and which attempts to thermally stabilize the resin by catechin and reduce the impact stress by the phenone compound or saccharides and strengthens the bond of the inorganic particles with the matrix resin to not only prevent the resin from being deteriorated in heating and melting but also prevent the resin from lowering in an IZOT impact strength.

The fourth object of the present invention is to provide a resin additive which not only provides a thermoplastic resin with heat stability in heating and melting the resin but also prevents the resin from lowering in an IZOT impact strength.

Further object of the present invention is to provide a resin additive which not only provides a thermoplastic polycarbonate resin, a thermoplastic polyester resin or a thermoplastic resin comprising these polycarbonate resin and polyester resin with heat stability in heating and melting the resin but also prevents the resin from lowering in an IZOT impact strength.

Another object of the present invention is to provide a resin additive which makes it possible to recycle the product.

Still another object of the present invention shall become more distinct from the following explanations.

DISCLOSURE OF THE INVENTION

It has been found that the preceding objects of the present invention can be achieved by:

1. a resin additive prepared by subjecting inorganic particles to surface treatment with catechin,
2. a resin additive prepared by subjecting inorganic particles to surface treatment with catechin and further subjecting them to surface treatment with a coupling agent,
3. a resin additive prepared by subjecting inorganic particles to surface treatment with catechin and then subjecting them to surface treatment with a phenone compound, followed by further subjecting them to surface treatment with a coupling agent, and
4. a resin additive prepared by subjecting inorganic particles to surface treatment with catechin and then subjecting them to surface treatment with saccharides, followed by further subjecting them to surface treatment with a coupling agent.

DETAILED DESCRIPTION OF THE INVENTION

The resin additive of the present invention shall be explained below in further details.

The inorganic particles used in the present invention shall not specifically be restricted and may be any inorganic particles as long as they can effectively be used for the objects of the present invention. Specific examples thereof include silica salts such as silica, anhydrous silica, silica gel, talc, clay, mica aluminum silicate and kaolinite, alumina and salts thereof such as aluminates. In addition thereto, inorganic substances staying in a glass state, that is, glass can also be used as an inorganic material in the present invention. Various materials such as oxide glass, particularly silicate glass, powder of glass fiber, glass beads, glass balloon and fly ash can be used. Further, carbon and powder of carbon fiber can also be used as an inorganic particle. Among them, silica powder is produced in nature and therefore is excellent in profitability, so that it is preferably used. The particle size and form of the inorganic particles used shall not specifically be restricted and are suitably selected and used according to the kind and the use purposes thereof.

Next, catechin used in the present invention is a polyhydric phenol compound which is a polyoxy derivative of 3-oxyflavane and contained widely in plants in the natural world. It is said that catechin includes heterogeneous types having various molecular structures, and all ones are natural compounds, so that a lot of catechins having different structures are present. Catechin used in the present invention shall not specifically be restricted and may be any one as long as it is catechin which can effectively be used for the objects of the present invention. Catechin is called astringent juice. At present, catechin is used medically as a carcinostatic substance and industrially as a color fixing agent and a mordant for nylon. Catechin is very soluble in water and lower alcohols and therefore can be used in the form of a solution having a high concentration.

Four kinds of typical catechins are shown by the following formulas (a) to (d), respectively. Further, catechins are compounds contained widely in plants in the natural world as described above, and therefore it is readily presumed that they have partially different chemical structures. In the present invention, such polyhydric phenols shall not be distinguished from catechin and can be used synonymously therewith.

(d) Ouebrachocatechin

The treatment of the inorganic particles with catechin is carried out by adding the inorganic particles to a solution of catechin and stirring to allow catechin to be adsorbed thereon, followed by filtering and drying the treated inorganic particles. In this case, with respect to the use amount of catechin, the inorganic particles are preferably treated in a solution containing catechin of 0.5 to 6.0% by weight (wt %) based on the inorganic particles to be treated. If the amount of catechin is smaller than 0.5 wt %, a heat stability effect for the resin is not revealed. On the other hand, even if the amount is more than 6.0 wt %, the effect remains unchanged, and therefore it is meaningless to use more amount than that. A solvent used in the treatment with catechin includes water, lower alcohols, tetrahydrofuran, toluene, benzene, acetone, acetonitrile, various ketones and esters. Water and lower alcohols are preferably used. The concentration of the catechin solution used in the present invention shall not specifically be restricted as long as it is not more than the saturated concentration of catechin at a temperature in allowing catechin to be adsorbed on the surface of the inorganic particles, and any concentration can be used. The temperature in allowing catechin to be adsorbed on the inorganic particles shall not specifically be restricted, but it is usually a room temperature. Two or more kinds of catechin can be used. The catechin-treated inorganic particles (abbreviated as particles 1) thus obtained can be used as a resin additive as they are. Further, this is treated with a coupling agent or treated with a phenone compound or saccharides and then further treated with a coupling agent, whereby the resin additive of the present invention can be prepared.

Next, the phenone compound used in the present invention is benzophenone or a derivative thereof and is suitably benzophenone itself. It is a matter of course, however, that the phenone compound may be a derivative of benzophenone such as benzophenone-2-carboxylic acid and benzophenone-4,4-dicarboxylic acid. The phenone compound functions in the same way as that of the coupling agent, and therefore the same amount as that of the coupling agent may be used. The use range thereof is preferably 0.4 to 4.2 wt % based on the catechin-treated inorganic particles. If the amount of the phenone compound is too small, the effect is not revealed. On the other hand, if the amount is too much, it reduces the mechanical strength of the resin by functioning as a plasticizer. Accordingly, both are not preferred.

The treatment of the particles 1 with the phenone compound is carried out by a method in which the phenone compound corresponding to 0.4 to 4.2 wt % of the particles 1 is dissolved in an organic solvent such as toluene and xylene and the particles 1 are added thereto and sufficiently stirred, followed by filtering and drying the treated particles 1 to obtain the phenone compound-treated particles 1 (hereinafter abbreviated as particles 2). In this case, the phenone compound and the particles 1 may be added to the organic solvent in any order. The treating conditions with the phenone compound shall not specifically be restricted, and the treating temperature, the treating time and the kind and the amount of the solvent used are suitably selected according to the kinds and the amounts of the inorganic particles and the phenone compound. Two or more kinds of the phenone compound can be used. The particles 2 thus obtained are further subjected to subsequent treatment with the coupling agent.

The saccharides used in the present invention include monosaccharides, oligosaccharides and polysaccharides, and various saccharides can be used. In particular, glucose, fructose, maltose and sugar are suited. It is a matter of course that polysaccharides such as anthocyanin, anthocyanidin, saponin and derivatives thereof can be used as well. The saccharides function in the same way as that of the coupling agent, and therefore the same amount as that of the coupling agent may be used. The use range thereof is preferably 0.4 to 4.2 wt % based on the inorganic particles treated with catechin. If the amount of the saccharides is too small, the effect is not revealed. On the other hand, if the amount is too much, it reduces the mechanical strength of the resin by functioning as a plasticizer.

The treatment of the particles 1 with the saccharides is carried out by a method in which the saccharides corresponding to 0.4 to 4.2 wt % of the particles 1 to be treated is dissolved in a solvent such as water and the above particles 1 to be treated are added thereto and sufficiently stirred to allow the saccharides to be adsorbed thereon, followed by filtering and drying the treated particles 1 to obtain the saccharides-treated particles 1 (hereinafter abbreviated as particles 3). In this case, the saccharides and the particles 1 may added to the solvent in any order. The treating conditions with the saccharides shall not specifically be restricted, and the treating temperature, the treating time and the kind and the amount of the solvent used are suitably selected according to the kinds and the amounts of the inorganic particles and the saccharides. Two or more kinds of the saccharides can be used. The method for treating with the saccharides shall not be restricted thereto, and any method can be used. The particles 3 thus obtained are further subjected to subsequent treatment with a coupling agent.

Silane base coupling agents are preferably used as the coupling agent used in the present invention. Among them, compounds having a terminal group such as an epoxy group, a vinyl group or an amino group are preferably used. To be specific, these silane base coupling agents include, for example, vinyl triethoxysilane, γ-methacryloxypropyl trimethoxysilane, γ-glycidoxypropyl trimethoxysilane, γ-aminopropyl triethoxysilane and trifluoropropylmethyl dimethoxysilane. The particularly preferred silane base coupling agents include γ-methacryloxypropyl trimethoxysilane, γ-glycidoxypropyl trimethoxysilane and trifluoropropylmethyl dimethoxysilane. The silane base coupling agent is used in a proportion of 0.4 to 4.2 wt %, preferably 0.8 to 2.5 wt % based on the weight of the inorganic particles treated with catechin. If the surface-treated amount with the coupling agent is small, the effect is not revealed. On the other hand, if the amount is too much, the coupling agent functions as a plasticizer in the resin and reduces the mechanical properties of the resin. Accordingly, both are not preferred.

The treatment of the particles 1, 2 or 3 with the coupling agent can be carried out by various methods, and it can be carried out, for example, by a method in which the coupling agent corresponding to 0.4 to. 4.2 wt % of the particles 1 or the particles 1 used for producing the particles 2 or 3 is dissolved in water or an organic solvent such as toluene and xylene and the particles 1, 2 or 3 to be treated with the coupling agent are added thereto and sufficiently stirred to allow the coupling agent to be adsorbed thereon, followed by filtering and drying the treated particles 1, 2 or 3 to obtain the coupling agent-treated particles 1, 2 or 3 (the resin additive of the present invention). In this case, the coupling agent and the particles 1, 2 or 3 may added to the solvent in any order. The treating conditions with the coupling agent shall not specifically be restricted, and the treating temperature, the treating time and the kind and the amount of the solvent used are suitably selected according to the kinds and the amounts of the inorganic particles and the coupling agent. Two or more kinds of the coupling agents can be used in combination. In addition thereto, a method for treating with the coupling agent includes a method in which the coupling agent or a solution of the coupling agent is sprayed directly on the particles 1, 2 or 3. In this case, it is more effective to leave the particles 1, 2 or 3 subjected to spraying treatment for standing in a closed vessel at a room temperature to about 40° C. for several days to about one month after spraying. Further, there can be used, a method in which the particles 1, 2 or 3, the coupling agent and a resin are molten and kneaded at the same time, but the present invention shall not be restricted to these methods, and any methods may be used. With respect to the treating order of the inorganic particles in producing the resin additive of the present invention, treatment with catechine is usually carried out at first, or treatment with the phenone compound or the saccharides is carried out, and treatment with the coupling agent is carried out at last. However, this treating order shall not be restricted thereto, and the treatment may be carried out in any order.

The resin to which the resin additive of the present invention is added shall not specifically be restricted, but polycarbonate resins and thermoplastic polyester resins, particularly polyethylene terephthalate and polybutylene terephthalate are suited. Further, blends thereof and blended resins of one or a combination of a plurality thereof and other resins, for example, PC/ABS, PBT/ABS, PC/PBT, PC/PET and PC/polystyrene are preferably used.

In general, the resin additive of the present invention is added to a resin in a proportion of 0.5 to 3.5 wt % based on the resin.

The inorganic particles subjected to surface treatment with catechin allow the molecules of catechin to stick strongly on the surfaces thereof. On the other hand, when the resin is thermally decomposed, radical molecules are produced, and if the radical molecules can be turned to stable molecules, the resin can be inhibited from being decomposed. Catechin has many hydroxyl groups, and these hydroxyl groups trap radicals produced by decomposition of the resin. However, it is considered that a lot of the hydroxyl groups are present as well on the outside of catechin which sticks firmly on the surface of the inorganic particles, and as a result thereof, it is considered that the inorganic particles subjected only to surface treatment with catechin can inhibit the resin from being decomposed but do not have so much wettability to the matrix resin. This results in preventing the resin from combining firmly with the inorganic particles. Accordingly, the IZOT impact strength results in lowering from the intrinsic value of the resin to a large extent. It is expected that two matters of a stabilization of the resin and an inhibition of a reduction in the IZOT impact strength can be achieved at the same time by allowing the inorganic particles subjected only to surface treatment with catechin or the inorganic particles obtained by further subjecting them to surface treatment with the saccharides or the phenone compound to adhere firmly to the matrix resin with the coupling agent. On the other hand, it is considered that the phenone compound or the saccharides which is present between the catechin layer and the coupling agent layer functions as a so-called cushion which disperses a stress exerted on the resin, whereby an effect to prevent a larger reduction in the IZOT impact strength can be obtained. However, the present invention shall not be restricted by such reason.

The inorganic particles thus obtained subjected only to surface treatment with catechin or the inorganic particles obtained by further subjecting the inorganic particles subjected to surface treatment with catechin or the inorganic particles subjected to surface treatment with catechin and subsequently to surface treatment with the phenone compound or the saccharides to surface treatment with the coupling agent become, as described above, a resin additive which can inhibit a reduction in the molecular weight of the resin or can inhibit not only a reduction in the molecular weight but also a reduction in the IZOT impact strength.

EFFECTS OF THE INVENTION

As shown in the following examples and comparative examples, the resin additive of the present invention obtained by subjecting the inorganic particles only to surface treatment with catechin can inhibit a reduction in the molecular weight of the thermoplastic resin in heating and melting. Further, the resin additive obtained by further subjecting the inorganic particles subjected to surface treatment with catechin to surface treatment with the coupling agent, or the resin additive obtained by subjecting the inorganic particles to surface treatment with catechin, then to surface treatment with the phenone compound or the saccharides and subsequently to surface treatment with the coupling agent can inhibit as well the IZOT impact strength. Accordingly, the resin additive of the present invention has the effect that it can inhibit a reduction in the molecular weight of the thermoplastic resin such as PC, PBT, PET and blended resins thereof or not only can inhibit a reduction in the molecular weight in heating and melting but also can decrease a reduction in the IZOT impact strength.

Figure 1:
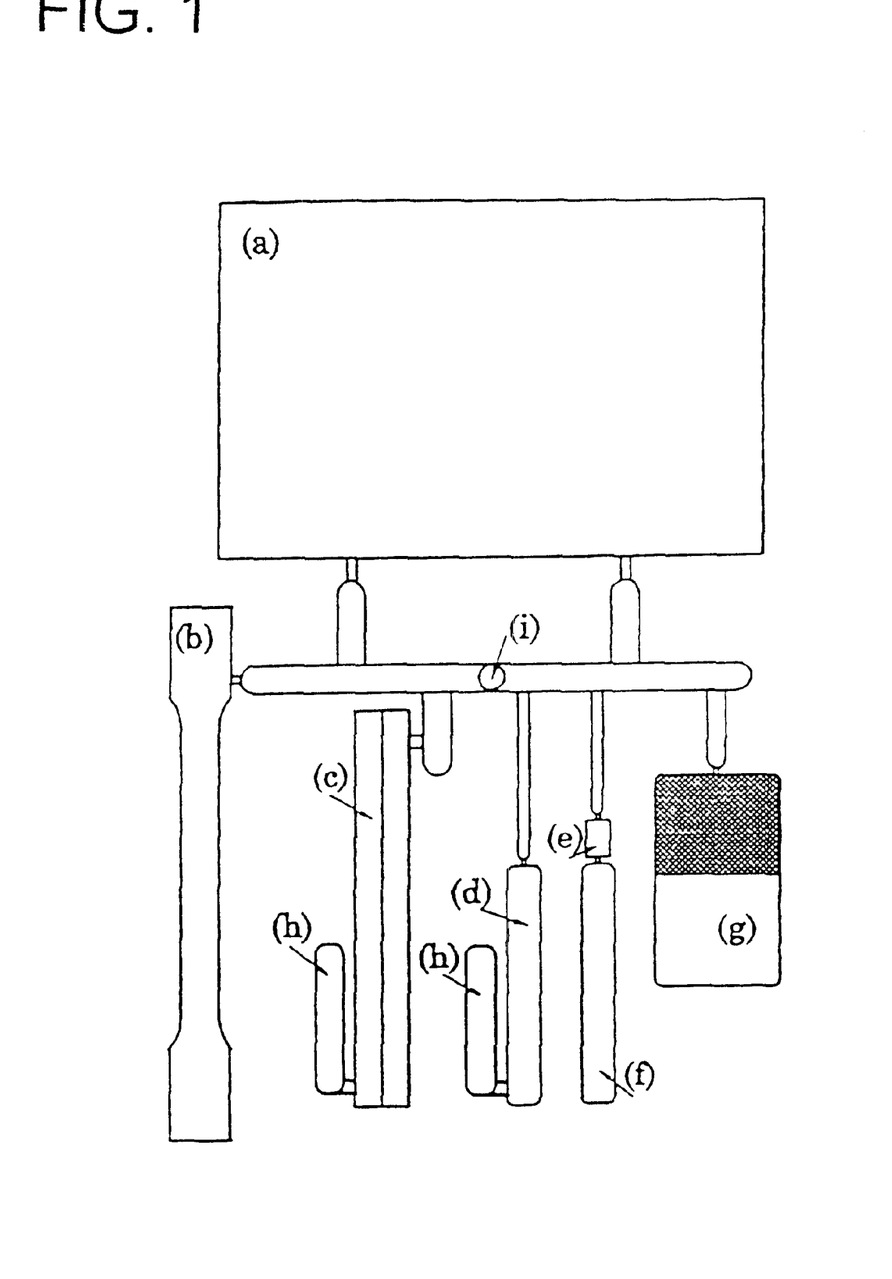
FIG. 1 shows injection-molded articles used in the examples of the present invention, which are joint-molded articles of various test pieces.

Explanation of Codes
(a) Falling weight test board
(b) Tensile test piece
(c) HDT test piece
(d) IZOT impact strength test piece
(e) Compression test piece
(f) Flexural strength test piece
(g) Color test board
(h) Resin reservoir
(i) Introducing port for molten resin

EXAMPLES

The present invention shall be explained below in further details with reference to examples and comparative examples.

Example 1

A 300 ml beaker was charged with 200 ml of demineralized water, and 3 g of catechin (pharmacopoeial catechin manufactured by Toyama Chemical Ind. Co., Ltd.) was dissolved therein. Put therein was 100 g of silica-powder (IMSIL A-25: average particle diameter of 3.2 $\mu$m, manufactured by Unimin Specialty Minerals Inc.). In this case, the amount of catechin corresponded to 3 wt %. This was stirred for 10 minutes by means of a glass bar. Then, the solution was filtered by suction through a Buchner funnel, and the filtrate was dried at 60° C. for 24 hours in a dryer (Model D-30: manufactured by Daiwa Kagaku Co., Ltd.). This was added to 10 kg of a PC resin (Panlite L-1250; Mn: 24700, Mw: 60800, Mw/Mn: 2.46, IZOT impact strength: 66 kgfcm/cm, manufactured by Teijin Kasei Co., Ltd.), and they were mixed in a paper bag to find that they could be mixed in a state that the pellets were almost covered, though the powder was separated from the pellets to some extent at the bottom of the bag. The whole amount of this resin was put in a hopper of an injection-molding machine (Model IS-170, manufactured by Toshiba Machinery Co., Ltd.) and molded at a nozzle temperature of 280° C., an injection pressure of 995 kgf/cm$^2$, a holding pressure of 595 kgf/cm$^2$, an injection time of 1.61 second and a holding time of 21.4 seconds by means of a die capable of joint-molding various test pieces to prepare various test pieces. The molded articles thereof are shown in FIG. 1.

It was tried to recycle 100% of the PC material on the same molding conditions, and all the molded test pieces were crushed by means of a crusher (Model FNSK-15D: 1.5 kw, manufactured by Nissui Kako Co., Ltd.). The crushed resins were dried again at 110° C. for 4 hours by means of a dehumidifying dryer (Model DR-30Z, manufactured by Kawata Co., Ltd.) and a temperature controller (Model DN2-20-3, manufactured by Kato Riki Mfg. Co., Ltd.), and injection molding was repeated four times on the same conditions. A part of this test piece was sampled and put in a conical flask equipped with a ground stopper together with a etrahydrofuran (THF) solvent, and after controlling the combined system to a concentration of 0.05 wt %, the flask was left for standing in a room for a whole day and night to dissolve the combined system. Silica particles were filtered off and separated from this by means of a microfilter (GL Chromatodisk 13N, nonaqueous type, manufactured by Kurashiki Boseki Co., Ltd.) to prepare a sample for determining the PC molecular weight. The average molecular weight was determined by dissolving standard polystyrene (Standard PS, Mw/Mn=1.06, manufactured by Pressure Chemical Co., Ltd.) in advance in THF in the same concentration as that of the sample and relatively converting from the calibration curve of the molecular weight to the column discharge time. The results thereof are shown in Table 1.

Comparative Example 1

The molecular weight was determined on the same conditions as in Example 1, except that PC containing nothing was used and injection-molded The result thereof is shown together in Table

Example 2

Samples obtained by changing the catechin-treated amount to 0.5, 1.0, 2.0, 4.0, 5.0 and 6.0 wt % based on anhydrous silica were prepared in the same manner and procedure as in Example 1. For the sake of convenience, they were designated as KN 0.5, KN 1.0, KN 2.0, KN 4.0, KN 5.0 and KN 6.0. The molecular weights thereof were determined in the same manner as in Example 1, and the results thereof are shown together in Table 1.

Comparative Example 2

Samples prepared by adding 0.2 and 4.5 wt % of catechin which had not been prepared in Example 2 were measured for molecular weights to obtain results shown in Table 1. As can be found from this, when the amount of catechin is small, PC is degraded to a large extent, but even if it is large, so much effect can not be obtained.

TABLE 1

Results of examples and comparative examples

|  | Molecular weight Mn | Molecular weight Mw | Dispersibility Mw/Mn |
|---|---|---|---|
| Example 1 | 22,300 | 49,500 | 2.22 |
| Comparative Example 1 | 19,100 | 45,800 | 2.40 |
| Example 2 |  |  |  |
| KN 0.5 | 21,300 | 47,200 | 2.22 |
| KN 1.0 | 21,500 | 48,100 | 2.24 |
| KN 2.0 | 21,900 | 49,100 | 2.24 |
| KN 4.0 | 22,200 | 49,400 | 2.22 |
| KN 5.0 | 22,000 | 49,100 | 2.23 |
| KN 6.0 | 21,900 | 48,900 | 2.23 |
| Comparative Example 2 |  |  |  |
| 0.2 wt % | 21,100 | 46,500 | 2.20 |
| 6.5 wt % | 21,500 | 49,100 | 2.28 |

Example 3

The same procedure as in Example 1 was repeated, except that PC was changed to a PBT resin (Julanex 3200, manufactured by Polyplastic Co., Ltd.), PET (Kurapet 1030, manufactured by Kuraray Co., Ltd.), a PC/ABS alloy (Ubeloy CX10A, manufactured by Ube Cycon Co., Ltd.) and PBT/ABS (Novaloy-B, B1500, manufactured by Daicel Chemical Ind. Co., Ltd.). These resins are very hard to be soluble in organic solvents, and therefore the melt viscosities were compared and evaluated in terms of a melt flow rate (MFR). The MFR was measured at a load of 5 kg and a temperature of 240° C. by means of Model C-5059 manufactured by Toyo Seiki Seisakusho Co., Ltd. The results thereof are shown together in Table 2.

TABLE 2

|  |  | MRF (g/10 min) |
|---|---|---|
| Example 3 | PC/ABS | 35 |
|  | PBT | 24 |
|  | PET | 18 |
|  | PBT/ABS | 26 |
| Comparative Example 3 | PC/ABS | 68 |
|  | PBT | 42 |
|  | PET | 39 |
|  | PBT/ABS | 58 |

Comparative Example 3

The respective resins used in Example 3 were repeatedly molded as they were in the same manner as in Example 1 to measure MRF. The results thereof are shown together in Table 2. As an be seen from this, the resins containing no additives rise in the values of MRF, that is, lower in molecular weights.

Example 4

A 300 ml beaker was charged with 200 ml of demineralized water, and 3 g of catechin (pharmacopoeial catechin manufactured by Toyama Chemical Ind. Co., Ltd.) was dissolved therein. Put therein was 100 g of silica powder (IMSIL A-25: average particle diameter of 3.2 µg, manufactured by Unimin Specialty Minerals Inc.). In this case, the amount of catechin corresponded to 3 wt %. This was stirred for 10 minutes by means of a glass bar. Then, the solution was filtered by suction through a Buchner funnel, and the filtrate was dried at 60° C. for 24 hours in the dryer (Model D-30: manufactured by Daiwa Kagaku Co., Ltd.). For the sake of convenience, this was designated as KN 3. Further, 2 g of a silane coupling agent (KBM503, manufactured by Shin-etsu Chemical Ind. Co., Ltd.) was added to 200 ml of xylene and dissolved therein, and KN 3 was added thereto. After stirring for 10 minutes by means of a glass .bar, the solution was filtered similarly through the Buchner funnel, and the filtrate was dried similarly at 60° C. for one hour in the dryer to confirm that it did not smell xylene. This was added to 10 kg of the PC resin (Panlite L-1250; Mn: 24700, Mw: 60800, Mw/Mn: 2.46, IZOT impact strength:. 66 kgfcm/cm, manufactured by Teijin Kasei Co., Ltd.), and they were mixed in a paper bag to find that they could be mixed in a state that the pellets were almost covered, though the powder was separated from the pellets to some extent at the bottom of the bag. The whole amount of this resin was put in a hopper of the injection-molding machine (Model IS-170, manufactured by Toshiba Machinery Co., Ltd.) and molded at a nozzle temperature of 280° C., an injection pressure of 995 kgf/cm$^2$, a holding pressure of 595 kgf/cm$^2$, an injection time of 1.61 second and a holding time of 21.4 seconds by means of a die capable of joint-molding various test pieces to prepare various test pieces. Based are an IZOT impact test piece on JIS K7110, a tensile strength test piece on JIS K7113 and a flexural strength test piece on JIS K7203. Further, the resin was molded by means of a die capable of molding a plate of 2.5 mm×127 mm×254 mm at the same time. The molded articles thereof are shown in FIG. 1.

It was tried to recycle 100% of the PC material on the same molding conditions, and all the molded test pieces were crushed by means of the crusher (Model FNSK-15D: 1.5 kw, manufactured by Nissui Kako Co., Ltd.). The crushed resins were dried again at 110° C. for 4 hours by means of the dehumidifying dryer (Model DR-30Z, manufactured by Kawata Co., Ltd.) and the temperature controller (Model DN2-20-3, manufactured by Kato Riki Mfg. Co., Ltd.), and injection molding was repeated four times on the same conditions. The IZOT impact test piece has a size based on JIS K7110. This was prepared by means of the JISLD type IZOT tester manufactured by Toyo Seiki Seisakusho Co., Ltd., wherein a V notch was formed by means of Model B3515 manufactured by the same company. Thus, the impact strength was determined to find that it was 45 kgfcm/cm. Further, a part of this test piece was sampled and put in a conical flask equipped with a ground stopper together with a tetrahydrofuran (THF) solvent, and after controlling this combined system to a concentration of 0.05 wt %, the flask was left for standing in a room for a whole day and night to dissolve the combined system. Silica particles were filtered off and separated from this by means of the microfilter (GL Chromatodisk 13N, nonaqueous type, manufactured by Kurashiki Boseki Co., Ltd.) to prepare a sample for determining the PC molecular weight. The average molecular weight was determined by dissolving standard polystyrene (Standard PS, Mw/Mn=1.06, manufactured by Pressure Chemical Co., Ltd.) in advance in THF in the same concentration as that of the sample and relatively converting from the calibration curve of the molecular weight to the column discharge time. The results thereof are shown in Table 3.

Comparative Example 4

The IZOT impact strength was determined on the same conditions as in Example 4, except that PC containing nothing was used and injection-molded. The result thereof is shown together in Table 3.

Example 5

The IZOT impact strength and the molecular weight were determined in the same manners as in Example 4, except that the inorganic particles were changed to those subjected only to catechin treatment in Example 4. The result thereof is shown together in Table 3.

Example 6

Prepared was 5 kg of KN 3 obtained by treating silica powder with 3 wt % of catechin in the same manner and procedure as in Example 4. Added to each 100 g taken from this were 0.4, 0.7, 1.5, 2.0, 3.0 and 4.0 wt % of the silane coupling agent to thereby prepare samples. For the sake of convenience, they are designated as KNS 0.4, KNS 0.7, KNS 1.5, KNS 2.0, KNS 3.0 and KNS 4.0. The IZOT impact strengths thereof were determined in the same manner as in Example 4, and the results thereof are shown together in Table 3. As can be found from this, those treated with the silane coupling agent are less reduced in an IZOT impact strength.

Example 7

Samples prepared by adding 0.2 and 4.5 wt % of the silane coupling agent which had not been prepared in Example 6 were measured for IZOT impact strengths to obtain results shown in Table 3. As can be found from this, when the amount of the silane coupling agent is small, the IZOT impact strength is small, but even if it is large, so much effect can not be obtained.

Example 8

The same procedure as in Example 4 was repeated, except that PC was changed to a PBT resin (Julanex 3200, manufactured by Polyplastic Co., Ltd.), PET (Kurapet 1030, manufactured by Kuraray Co., Ltd.), a PC/ABS alloy (Ubeloy CX10A, manufactured by Ube Cycon Co., Ltd.) and PBT/ABS (Novaloy-B, B1500, manufactured by Daicel Chemical Ind. Co., Ltd.). The results thereof are shown together in Table 3.

Comparative Example 5

The respective resins used in Example 8 were repeatedly molded as they were in the same manner as in Example 4 to measure the IZOT impact strengths. The results thereof are shown together in Table 3. As can be found well from this, the resins containing no additives are reduced in IZOT impact strengths.

TABLE 3

Results of examples and comparative examples

| | IZOT impact strength kgfcm/cm | Molecular weight Mn | Molecular weight Mw | Dispersibility Mw/Mn |
|---|---|---|---|---|
| Example 4 | 45 | 22,100 | 48,500 | 2.19 |
| Comparative | 29 | 19,100 | 45,800 | 2.40 |
| Example 5 | 10 | 22,300 | 46,500 | 2.09 |
| Example 6 | | | | |
| KNS 0.4 | 38 | — | — | — |
| KNS 0.7 | 41 | — | — | — |
| KNS 1.5 | 42 | — | — | — |
| KNS 2.0 | 45 | — | — | — |
| KNS 3.0 | 45 | — | — | — |
| KNS 4.0 | 44 | — | — | — |
| Example 7 | | | | |
| 0.2 wt % | 32 | — | — | — |
| 4.5 wt % | 43 | — | — | — |
| Example 8 | | | | |
| PC/ABS | 40 | — | — | — |
| PBT | 6 | — | — | — |
| PET | 8 | — | — | — |
| PBT/ABS | 3 | — | — | — |
| Comparative Example 5 | | | | |
| PC/ABS | 22 | — | — | — |
| PBT | 1 | — | — | — |
| PET | 2 | — | — | — |
| PBT/ABS | 1 | — | — | — |

Example 9

A 300 ml beaker was charged with 200 ml of demineralized water, and 3 g of catechin (pharmacopoeial catechin manufactured by Toyama Chemical Ind. Co., Ltd.) was dissolved therein. Put therein was 100 g of silica powder (IMSIL A-25: average particle diameter of 3.2 $\mu$m, manufactured by Unimin Specialty Minerals Inc.). In this case, the amount of catechin corresponded to 3 wt % based on the silica particles subjected to surface treatment. This was stirred for 10 minutes by means of a glass bar. Then, the solution was filtered by suction through a Buchner funnel, and the filtrate was dried at 60° C. for 24 hours in the dryer (Model D-30: manufactured by Daiwa Kagaku Co., Ltd.). For the sake of convenience, this was designated as KN 3. Dissolved in 200 ml of xylene was 2 g of benzophenone (guaranteed reagent, manufactured by Wako Junyaku Ind. Co., Ltd.), and KN 3 was added thereto. This was stirred for 10 minutes by means of a glass bar and then filtered by suction through the Buchner funnel. The filtrate was dried similarly at 60° C. for one hour to confirm that it did not smell xylene. This was designated as KNB 3. Next, 2 g of the silane coupling agent (KBM503, manufactured by Shin-etsu Chemical Ind. Co., Ltd.) was similarly added to 200 ml of xylene and dissolved, and KNB 3 was added thereto. After stirring for 10 minutes by means of a glass bar, the solution was filtered similarly through the Buchner funnel, and the filtrate was dried similarly at- 60° C. for one hour in the dryer to confirm that it did not smell xylene. This was added to 10 kg of the PC resin (Panlite L-1250; Mn: 24700, Mw: 60800, Mw/Mn: 2.46, IZOT impact strength: 66 kgfcm/cm, manufactured by Teijin Kasei Co., Ltd.), and they were mixed in a paper bag to find that they could be mixed in a state that the pellets were almost covered, though the powder was separated from the pellets to some extent at the bottom of the bag. The whole amount of this resin was put in a hopper of the injection-molding machine (Model IS-170, manufactured by Toshiba Machinery Co., Ltd.) and molded at a nozzle temperature of 280° C., an injection pressure of 995 kgf/cm², a holding pressure of 595 kgf/cm², an injection time of 1.61 second and a holding time of 21.4 seconds by means of a die capable of joint-molding various test pieces to prepare various test pieces. Based are an IZOT impact test piece on JIS K7110, a tensile strength test piece on JIS K7113 and a flexural strength test piece on JIS K7203. Further, the resin was molded by means of a die capable of molding a plate of 2.5 mm×127 mm×254 mm at the same time. The molded articles thereof are shown in FIG. 1.

It was tried to recycle the PC material at 100% on the same molding conditions, and all the molded test pieces were crushed by means of the crusher (Model FNSK-15D: 1.5 kw, manufactured by Nissui Kako Co., Ltd.). The crushed resins were dried again at 110° C. for 4 hours by means of the dehumidifying dryer (Model DR-30Z, manufactured by Kawata Co., Ltd.) and the temperature controller (Model DN2-20-3, manufactured by Kato Riki Mfg. Co., Ltd.), and injection molding was repeated four time on the same conditions. An IZOT impact strength test piece was prepared by means of the JISLD type IZOT tester manufactured by Toyo Seiki Seisakusho Co., Ltd., wherein a V notch was formed by means of Model B3515 manufactured by the same company. Thus, the impact strength was determined to find that it was 53 kgfcm/cm. Further, a part of this test piece was sampled and put in a conical flask equipped with a ground stopper together with a tetrahydrofuran (THF) solvent, and after controlling this combined system to a concentration of 0.05 wt %, the flask was left for standing in a room for a whole day and night to dissolve the combined system. Silica particles were filtered off and separated from this by means of the microfilter (GL Chromatodisk 13N, nonaqueous type, manufactured by Kurashiki Boseki Co., Ltd.) to prepare a sample for determining the PC molecular weight. The average molecular weight was determined by dissolving standard polystyrene (Standard PS, Mw/Mn=1.06, manufactured by Pressure Chemical Co., Ltd.) in advance in THF in the same concentration as that of the sample and relatively converting from the calibration curve of the molecular weight to the column discharge time. The results thereof are shown in Table 4.

Comparative Example 6

The IZOT impact strength was determined on the same conditions as in Example 9, except that PC containing nothing was 5; used and injection-molded. The result thereof is shown together in Table 4.

Example 10

The IZOT impact strength and the molecular weight were determined in the same manners as in Example 9, except that the 10 inorganic particles were changed to those subjected only to catechin treatment in Example 9. The result thereof is shown together in Table 4.

Example 11

Prepared was 5 kg of KN 3 obtained by treating silica particles with 3 wt % of catechin in the same manner and procedure as in Example 9. Added to each 100 g taken from this were 0.4, 0.7, 1.5, 2.0, 3.0 and 4.0 wt % of benzophenone, and the coupling agent was fixed to 2 wt % to carry out treatment to thereby prepare samples. For the sake of convenience, they are designated as KNBS 0.4, KNBS 0.7, KNBS 1.5, KNBS 2.0, KNBS 3.0 and KNBS 4.0. The IZOT impact strengths thereof were determined in the same manner as in Example 9, and the results thereof are shown together in Table 4. As can be found from this, those treated with the silane coupling agent are less reduced in an IZOT impact strength.

Example 12

Samples prepared by adding 0.2 and 4.5 wt % of benzophenone which had not been prepared in Example 11 were measured for IZOT impact strengths to obtain results shown in Table 4. As can be found from this, when the amount of benzophenone is small, the IZOT impact strength is relatively small, but even if it is large, so much effect can not be obtained.

Example 13

The same procedure as in Example 9 was repeated, except that PC was changed to a PBT resin (Julanex 3200, manufactured by Polyplastic Co., Ltd.), PET (Kurapet 1030, manufactured by Kuraray Co., Ltd.), a PC/ABS alloy (Ubeloy CX10A, manufactured by Ube Cycon Co., Ltd.) and PBT/ABS (Novaloy-B, B1500, manufactured by Daicel Chemical Ind. Co., Ltd.). The results thereof are shown together in Table 4.

Comparative Example 7

The respective resins used in Example 13 to which nothing was added were repeatedly molded as they were in the same manner as in Example 9 to measure IZOT impact strengths. The results thereof are shown together in Table 4. As can be found well from this, the resins containing no additives are reduced in IZOT impact strengths.

TABLE 4

Results of examples and comparative examples

| | IZOT impact strength kgfcm/cm | Molecular weight Mn | Molecular weight Mw | Dispersibility Mw/Mn |
|---|---|---|---|---|
| Example 9 | 53 | 22,700 | 50,300 | 2.22 |
| Comparative Example 6 | 29 | 19,100 | 45,800 | 2.40 |
| Example 10 | 10 | 22,300 | 49,500 | 2.22 |
| Example 11 | | | | |
| KNBS 0.4 | 48 | — | — | — |
| KNBS 0.7 | 50 | — | — | — |
| KNBS 1.5 | 52 | — | — | — |
| KNBS 2.0 | 53 | — | — | — |
| KNBS 3.0 | 53 | — | — | — |
| KNBS 4.0 | 50 | — | — | — |
| Example 12 | | | | |
| 0.2 wt % | 40 | — | — | — |
| 4.5 wt % | 49 | — | — | — |
| Example 13 | | | | |
| PC/ABS | 47 | — | — | — |
| PBT | 8 | — | — | — |
| PET | 8 | — | — | — |
| PBT/ABS | 3 | — | — | — |
| Comparative Example 7 | | | | |
| PC/ABS | 22 | — | — | — |
| PBT | 1 | — | — | — |
| PET | 2 | — | — | — |
| PBT/ABS | 1 | — | — | — |

Example 14

A 300 ml beaker was charged with 200 ml of demineralized water, and 3 g of catechin (pharmacopoeial catechin manufactured by Toyama Chemical Ind. Co., Ltd.) was dissolved therein. Put therein was 100 g of silica powder (IMSIL A-25: average particle diameter of 3.2 μg, manufactured by Unimin Specialty Minerals Inc.). In this case, the amount of catechin corresponded to 3 wt % based on the silica particles subjected to surface treatment. This was stirred for 10 minutes by means of a glass bar. Then, the solution was filtered by suction through a Buchner funnel, and the filtrate was dried at 60° C. for 24 hours in the dryer (Model D-30: manufactured by Daiwa Kagaku Co., Ltd.). For the sake of convenience, this was designated as KN 3. Dissolved in 200 ml of demineralized water was 2 g of glucose (guaranteed reagent, manufactured by Wako Junyaku Ind. Co., Ltd.), and KN 3 was added thereto. This was stirred for 10 minutes by means of a glass bar and then filtered by suction through the Buchner funnel. The filtrate was dried similarly at 60° C. for 24 hours. This was designated as KNA 3. Next, 2 g of the silane coupling agent (KBM503, manufactured by Shin-etsu Chemical Ind. Co., Ltd.) was further added similarly to 200 ml of xylene and dissolved therein, and KNA 3 was added thereto. After stirring for 10 minutes by means of a glass bar, the solution was filtered similarly through the Buchner funnel, and the filtrate was dried similarly at 60° C. for one hour in the dryer to confirm that it did not smell xylene. This was added to 10 kg of the PC resin (Panlite L-1250; Mn: 24700, Mw: 60800, Mw/Mn: 2.46, IZOT impact strength: 66 kgfcm/cm, manufactured by Teijin Kasei Co., Ltd.), and they were mixed in a paper bag to find that they could be mixed in a state that the pellets were almost covered, though the powder was separated from the pellets to some extent at the bottom of the bag. The whole amount of this resin was put in a hopper of the injection-molding machine (Model IS-170, manufactured by Toshiba Machinery Co., Ltd.) and molded at a nozzle temperature of 280° C., an injection pressure of 995 kgf/cm$^2$, a holding pressure of 595 kgf/cm$^2$, an injection time of 1.61 second and a holding time of 21.4 seconds by means of a die capable of joint-molding various test pieces to prepare various test pieces. Based are an IZOT impact test piece on JIS K7110, a tensile strength test piece on JIS K7113 and a flexural strength test piece on JIS K7203. Further, the resin was molded by means of a die capable of molding a plate of 2.5 mm×127 mm×254 mm at the same time. The molded articles thereof are shown in FIG. 1.

It was tried to recycle 100% of the PC material on the same molding conditions, and all the molded test pieces were crushed by means of the crusher (Model FNSK-15D: 1.5 kw, manufactured by Nissui Kako Co., Ltd.). The crushed resins were dried again at 110° C. for 4 hours by means of the dehumidifying dryer (Model DR-30Z, manufactured by Kawata Co., Ltd.) and the temperature controller (Model DN2-20-3, manufactured by Kato Riki Mfg. Co., Ltd.), and injection molding was repeated four time on the same conditions. The IZOT impact test piece has a size based on JIS K7110. An IZOT impact strength test piece was prepared by means of the JISLD type IZOT tester manufactured by Toyo Seiki Seisakusho Co., Ltd., wherein a V notch was formed by means of Model B3515 manufactured by the same company. Thus, the impact strength was determined to find that it was 50 kgfcm/cm. Further, a part of this test piece was sampled and put in a conical flask equipped with a ground stopper together with a tetrahydrofuran (THF) solvent, and after controlling this combined system to a concentration of 0.05 wt %, the flask was left for standing in a room for a whole day and night to dissolve the combined system. Silica particles were filtered off and separated from this by means of the microfilter (GL Chromatodisk 13N, nonaqueous type, manufactured by Kurashiki Boseki Co., Ltd.) to prepare a sample for determining the PC molecular weight. The average molecular weight was determined by dissolving standard polystyrene (Standard PS, Mw/Mn= 1.06, manufactured by Pressure Chemical Co., Ltd.) in advance in THF in the same concentration as that of the sample and relatively converting from the calibration curve of the molecular weight to the column discharge time. The results thereof are shown in Table 5.

Comparative Example 8

The IZOT impact strength was determined on the same conditions as in Example 14, except that PC containing nothing was used and injection-molded. The result thereof is shown together in Table 5.

Example 15

The IZOT impact strength and the molecular weight were determined in the same manners as in Example 14, except that the inorganic particles were changed to those subjected only to catechin 11treatment in Example 14. The result thereof is shown together in Table 5.

Example 16

Prepared was 5 kg of KN 3 obtained by treating silica particles with 3 wt % of catechin in the same manner as in Example 14. Added to each 100 g taken from this were 0.4, 0.7, 1.5, 2.0, 3.0 and 4.0 wt % of glucose, and, the coupling agent was fixed to 2 wt % to carry out treatment to thereby prepare samples. For the sake of convenience, they are designated as KNAS 0.4, KNAS 0.7, KNAS 1.5, KNAS 2.0, KNAS 3.0 and KNAS 4.0. The IZOT impact strengths thereof were determined in the same manner as in Example 14, and the results thereof are shown together in Table 5. As can be found from this, those treated with the silane coupling agent are less reduced in an IZOT impact strength.

Example 17

Samples prepared by adding 0.2 and 4.5 wt % of glucose which had not been prepared in Example 16 were measured for IZOT impact strengths to obtain results shown in Table 5. As can be found from this, when the amount of glucose is small, the IZOT impact strength is relatively small, but even if it is large, so much effect can not be obtained.

Example 18

The same procedure as in Example 14 was repeated, except that PC was changed to a PBT resin (Julanex 3200, manufactured by Polyplastic Co., Ltd.), PET (Kurapet 1030, manufactured by Kuraray Co., Ltd.), a PC/ABS alloy (Ubeloy CX10A, manufactured by Ube Cycon Co., Ltd.) and PBT/ABS (Novaloy-B, B1500, manufactured by Daicel Chemical Ind. Co., Ltd.). The results thereof are shown together in Table 5.

Comparative Example 9

The respective resins used in Example 18 to which nothing was added were repeatedly molded as they were in the same manner as in Example 14 to measure the IZOT impact strengths. The results thereof are shown together in Table 5. As can be found well from this, the resins containing no additives are reduced in IZOT impact strengths.

TABLE 5

Results of examples and comparative examples

| | IZOT impact strength kgfcm/cm | Molecular weight Mn | Molecular weight Mw | Dispersibility Mw/Mn |
|---|---|---|---|---|
| Example 14 | 50 | 22,500 | 50,000 | 2.22 |
| Comparative Example 8 | 29 | 19,100 | 45,800 | 2.40 |
| Example 15 | 10 | 22,300 | 49,500 | 2.22 |
| Example 16 | | | | |
| KNAS 0.4 | 41 | — | — | — |
| KNAS 0.7 | 43 | — | — | — |
| KNAS 1.5 | 45 | — | — | — |
| KNAS 2.0 | 49 | — | — | — |
| KNAS 3.0 | 50 | — | — | — |
| KNAS 4.0 | 49 | — | — | — |
| Example 17 | | | | |
| 0.2 wt % | 35 | | | |
| 4.2 wt % | 43 | — | — | — |
| Example 18 | | | | |
| PC/ABS | 47 | — | — | — |
| PBT | 6 | — | — | — |
| PET | 7 | — | — | — |
| PBT/ABS | 2 | — | — | — |
| Comparative Example 9 | | | | |
| PC/ABS | 22 | — | — | — |
| PBT | 1 | — | — | — |
| PET | 2 | — | — | — |
| PBT/ABS | 1 | — | — | — |
| Example 19 | 49 | — | — | — |
| Example 20 | 49 | — | — | — |
| Example 21 | 40 | — | — | — |

Example 19

The same procedure as in Example 14 was repeated, except that sugar (commercial granulated sugar) was substituted for glucose in Example 14. As a result thereof, the IZOT impact strength of 49 kgfcm/cm was obtained.

Example 20

The same procedure as in Example 14 was repeated, except that saponin (made from a tea seed, manufactured by Wako Junyaku Ind. Co., Ltd.) was substituted for glucose in Example 14. As a result thereof, the IZOT impact strength of 49 kgfcm/cm was obtained.

Example 21

The same procedure as in Example 14 was repeated, except that dextrin (chemical grade, manufactured by Wako Junyaku Ind. Co., Ltd.) was substituted for glucose in Example 14. As a result thereof, the IZOT impact strength of 40 kgfcm/cm was obtained.

What is claimed is:

1. A resin additive prepared by subjecting inorganic particles to surface treatment with catechin of 0.5 to 6.0 wt % based on the inorganic particles.

2. A resin additive prepared by subjecting inorganic particles to surface treatment with catechin and further subjecting them to surface treatment with a coupling agent.

3. The resin additive as described in claim 2, wherein the inorganic particles subjected to surface treatment with catechin are further subjected to surface treatment with the coupling agent corresponding to 0.4 to 4.2 wt % of the inorganic particles subjected to surface treatment with catechin.

4. A resin additive prepared by subjecting inorganic particles to surface treatment with catechin and then subjecting them to surface treatment with a phenone compound, followed by further subjecting them to surface treatment with a coupling agent.

5. The resin additive as described in claim 4, wherein the inorganic particles subjected to surface treatment with catechin are subjected to surface treatment with the phenone compound corresponding to 0.4 to 4.2 wt % of said inorganic particles and further subjected to surface treatment with the coupling agent corresponding to 0.4 to 4.2 wt % of the inorganic particles subjected to surface treatment with catechin.

6. A resin additive prepared by subjecting inorganic particles to surface treatment with catechin and then subjecting them to surface treatment with saccharides, followed by further subjecting them to surface treatment with a coupling agent.

7. The resin additive as described in claim 6, wherein the inorganic particles subjected to surface treatment with catechin are subjected to surface treatment with the saccharides corresponding to 0.4 to 4.2 wt % of said inorganic particles and further subjected to surface treatment with the coupling agent corresponding to 0.4 to 4.2 wt % of the inorganic particles subjected to surface treatment with catechin.

8. The resin additive as described in claim 6, wherein the saccharides are sugar and polysaccharides or a mixture thereof.

9. The resin additive as described in any of claims 2, 4 and 6, wherein the coupling agent is a silane base coupling agent.

10. The resin additive as described in any of claims 1, 2, 4 and 6, wherein the inorganic particle is silica, alumina, a salt thereof or glass.

11. The resin additive as described in any of claims 1, 2, 4 and 6, wherein the resin to which the resin additive is added is a thermo-plastic polycarbonate base resin or a thermoplastic resin containing this polycarbonate base resin.

12. The resin additive as described in any of claims 1, 2, 4 and 6, wherein the resin to which the resin additive is added is a thermo-plastic polyester base resin or a thermoplastic resin containing this polyester base resin.

* * * * *